United States Patent [19]

Brown et al.

[11] 3,715,408
[45] Feb. 6, 1973

[54] SEPARATION OF DIETHYLBENZENE ISOMERS BY DISTILLATION AND DEHYDROGENATION

[75] Inventors: Rene Paul Brown; Birt Allison, Jr., both of Big Spring, Tex.; Pierre Marie Joseph Ghislain de Radzitzky D'Ostrowick, Brussels, Belgium

[73] Assignee: Cosden Oil & Chemical Company, Big Spring, Tex.

[22] Filed: Jan. 30, 1970

[21] Appl. No.: 7,023

Related U.S. Application Data

[62] Division of Ser. No. 543,377, April 18, 1966, Pat. No. 3,539,623.

[52] U.S. Cl..............260/669 A, 260/674 A, 203/29, 203/31, 203/32, 203/48, 203/99 S
[51] Int. Cl.........................B01d 3/10, C07c 7/04
[58] Field of Search.........203/71, 31, 29, 32, 48, 73, 203/37, 99 S; 260/674 A, 669 A

[56] References Cited

UNITED STATES PATENTS

| 2,282,231 | 5/1942 | Mattox | 260/674 A |
| 2,733,281 | 1/1956 | Dreisback et al. | 260/669 A |
| 2,959,626 | 11/1960 | Krausse et al. | 203/84 |
| 3,209,044 | 9/1965 | Meek et al. | 260/669 A |
| 3,217,051 | 11/1965 | Rubinstein | 260/669 A |
| 3,217,052 | 11/1965 | Meek et al. | 260/669 A |
| 3,522,153 | 7/1970 | King | 203/29 |
| 3,539,623 | 11/1970 | Brown et al. | 203/71 |

Primary Examiner—Wilbur L. Bascomb, Jr.
Attorney—Sol B. Wiczer

[57] ABSTRACT

Mixed isomeric diethylbenzenes are separated into pure isomers by first distilling the mixture to separate an overhead concentrate of most of the meta isomer and the mixed para and ortho bottoms are then dehydrogenated and finally separated into substantially pure ortho and para isomers.

13 Claims, 4 Drawing Figures

INVENTORS
RENE PAUL BROWN
BIRT ALLISON, JR.
PIERRE MARIE JOSEPH GHISLAIN de
RADZITZKY d'OSTROWICK
BY
Sol B. Wicks
ATTORNEY

SEPARATION OF DIETHYLBENZENE ISOMERS BY DISTILLATION AND DEHYDROGENATION

This application is a division of my co-pending application, Ser. No. 543,377, filed Apr. 18, 1966 now U.S. Pat. No. 3,539,623.

This invention relates to resolution of a mixture of diethylbenzene isomers; to separation of relatively pure meta-diethylbenzene as a distillation overhead fraction from a relatively pure para- and ortho- diethylbenzene bottoms mixture; to the processing of diethylbenzene hydrocarbon fractions by oxidation or dehydrogenation of at least one alphy-ethyl carbon atom into more readily resolvable isomeric components; to production of oxidation products thereof, namely isophthalic acid, terephthalic acid, para-ethyl-acetophenone, para-diacetylbenzene; to unchanged pure or relatively concentrated meta-diethylbenzene; to concentrates of ortho- and para- diethylbenzenes low in meta-isomer content; and to the intermediate relatively pure isomeric products formed thereby.

Meta-diethylbenzene is reported to have about a 2° C boiling point margin above its ortho- and para-diethylbenzene isomers, the latter two isomers boiling less than 0.5° C from each other. Consequently, the resolution of a mixture of diethylbenzene isomers by distillation would not have appeared to be possible. Nevertheless, it has been found, according to one aspect of this invention, that better than 93 percent pure, usually better than 95 percent pure, and, for some fractions, better than 98 percent pure meta-diethylbenzene can be separated overhead from its mixture with the ortho- and para-diethylbenzene isomers by distillation. That order of purity identifies the separated meta-diethylbenzene product as sufficiently pure for practical further processing to other valuable products derivable from meta-diethylbenzene and now made available by this invention most economically and in an adequately pure state.

In a further aspect of this invention, the separation of the meta-diethylbenzene by simple distillation from the mixture leaves a bottoms intermediate mixture of para- and ortho-diethylbenzene isomers which, while inseparable by distillation, are nevertheless sufficiently pure by having such reduced content of meta-diethylbenzene, such as usually less than 5 percent, that this bottoms product may now be practically chemically treated either by oxidation or dehydrogenation of one or both alpha-ethyl-carbon atoms, whereby a mixture of separable para-divinylbenzene, para-ethylvinylbenzene and ortho-ethylvinylbenzene is formed by the dehydrogenation and such products as readily separable terephthalic acid, para-diacetyl benzene, isophthalic acid, para-ethyl-acetophenone, meta-ethyl-acetophenone and the like are formed by the oxidation. In the direct dehydrogenation of the bottoms mixture comprising para- and ortho-diethylbenzene, any ortho-divinylbenzene formed cyclizes to easily separable naphthalene.

According to this invention we have found that a mixture of ortho-, meta- and para-diethylbenzene isomers are efficiently processed to separate or reform the isomers into usefully pure products. The initial isomeric mixture preferably contains a substantial proportion, such as at least 20 percent, and usually a quantity in the range of 20 to 80 percent of meta-diethylbenzene, based on the weight of the mixture. Meta-diethylbenzene can be separated from such mixture as a substantially pure distillation overhead; that is, better than 93 percent pure, preferably at least 95 percent and, if desired, 98 to 99 percent pure. In such distillation we use a column still of at least 100 trays, preferably at least 200 trays at a reflux ratio of at least 30:1, usually about 40:1. A meta-diethylbenzene isomer of such degree of purity was never heretofore practically obtained by distillation. It may be directly processed to various derivatives such as by oxidation or dehydrogenation, sulfonation, halogenation and the like.

A preferred procedure is to oxidize the meta-isomer to meta-ethyl-acetophenone, diacetyl benzene and isophthalic acid, products available as desired by application of progressively severe oxidations which heretofore were exceedingly difficult to obtain in a correspondingly pure form. The bottoms mixture, too, is then oxidized progressively to form such alternate oxidation products.

In another alternate procedure, the mixed bottoms isomers are dehydrogenated to a mixture of para-divinylbenzene, para-ethyl-vinylbenzene and ortho-ethylvinylbenzene. The para-divinyl benzene compound can be separated as a distillation concentrate which can be hydrogenated selectively under controlled conditions to convert the divinylbenzene and ethylvinylbenzene to a para-diethylbenzene rich product from which is recovered pure para-diethylbenzene such as by further distillation.

As an alternate procedure the dehydrogenated mixture of para-divinylbenzene and ethylvinylbenzenes may be purified by crystallizing the same which are readily resolvable by distillation and crystallization, any ortho-divinylbenzene being cyclized to naphthalene in the dehydrogenation.

A practical source of the mixed ortho-, meta- and para- diethylbenzene isomer starting material has been as a by-product of production of ethylbenzene. In the catalytic alkylation of benzene with ethylene or ethyl chloride to produce ethylbenzene, some diethylbenzene mixed isomers are also formed. The diethylbenzene mixture may accumulate as bottoms in the ethylbenzene distillation. Moreover, some ethylbenzene may contaminate the bottoms. Other impurity may occur in the alkylate such as some $C_9$ hydrocarbon, such as ethyl toluene and propylbenzenes, and these may also contaminate the diethyl benzene bottoms. These impurities amount, after substantial accumulation with the bottoms, to from 0.1 to about 5 percent of the bottoms, depending upon the extent that they had been allowed to accumulate with the diethylbenzene bottoms.

Figure 2:
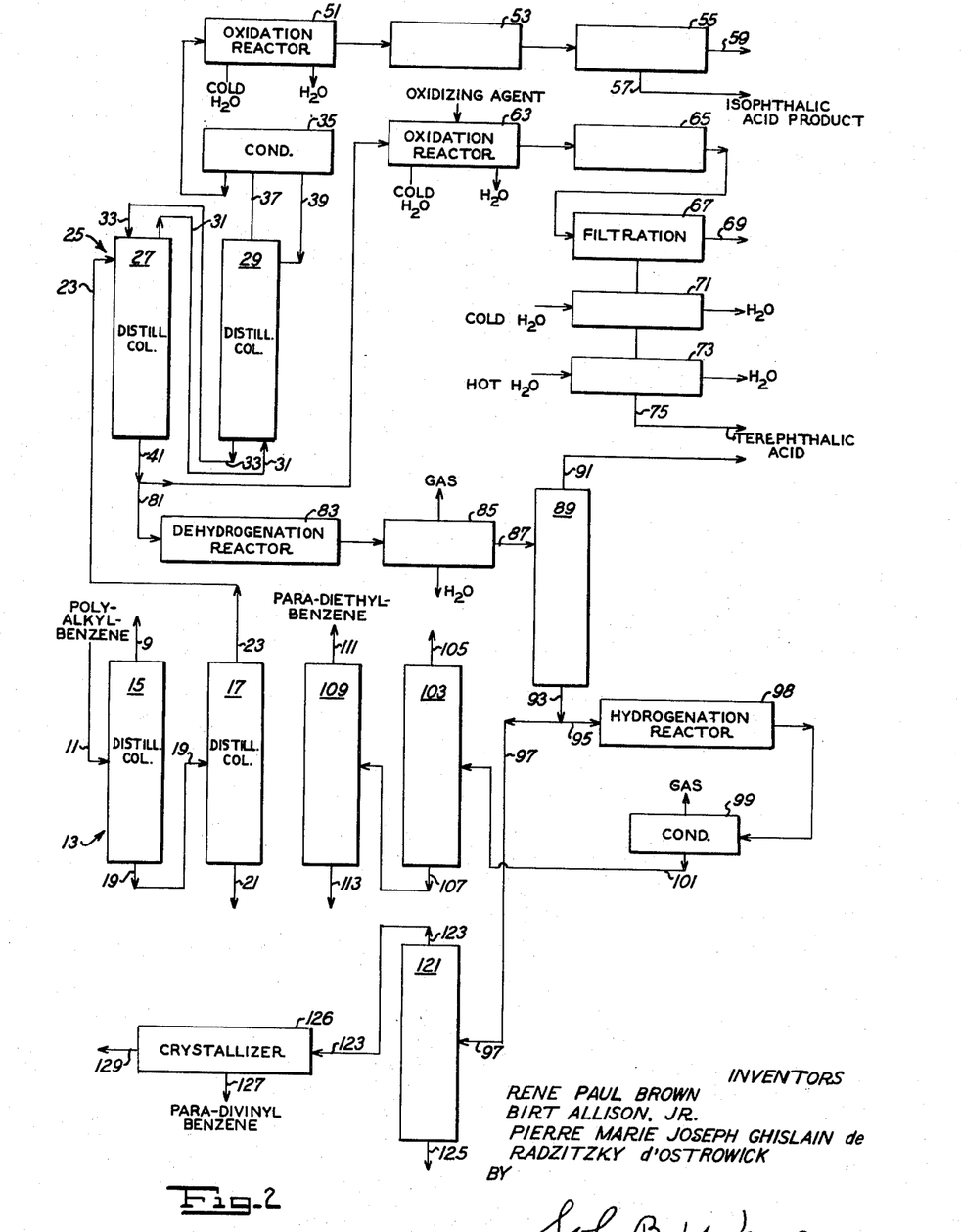
FIG. 2 is a flow diagram of a continuous process for the separation of diethylbenzene into a meta-rich fraction and a para-ortho-rich fraction, and including subsequent process steps which may be conducted to produce a variety of products.

It is possible, however, in the ethylbenzene distillation to remove the residual ethylbenzene as well as the $C_9$ hydrocarbon as an intermediate side stream in the ethylbenzene distillation so that only a relatively pure isomeric mixture of diethylbenzenes accumulates as bottoms during the main distillation of ethylbenzene. However, it is preferred to preliminarily purify the feedstream as shown in FIG. 2 and further described below.

The invention is further explained in conjunction with the drawings wherein.

Figure 1:
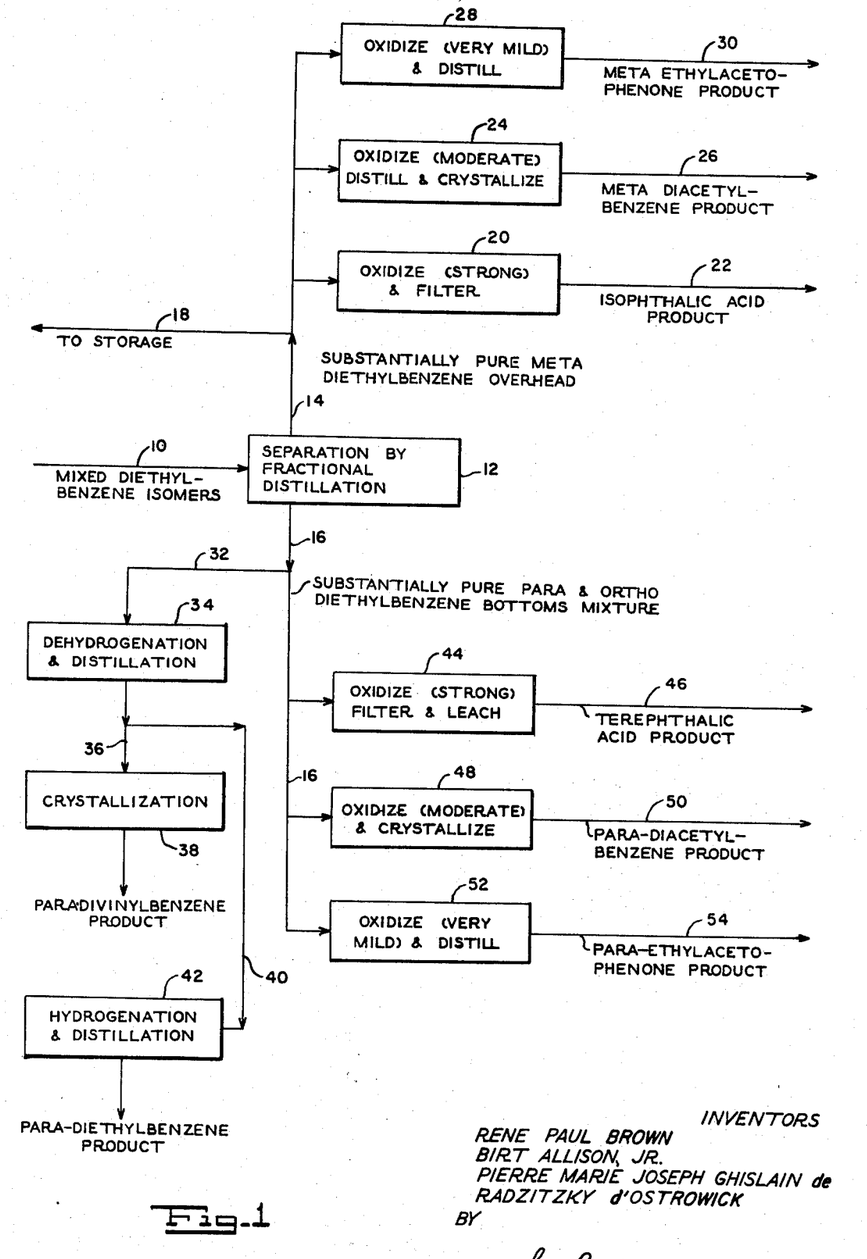
FIG. 1 is a process chart illustrating generally the course of processing and the various alternatives that may be followed, all in accordance with the present invention.

Referring to FIG. 1, a purified mixture of diethylbenzene isomers enters the system through line 10 in a distillation zone 12 to separate relatively pure meta-diethylbenzene overhead by way of line 14 and a bottoms mixture comprising substantially ortho and para-diethylbenzenes with a small quantity of less than 5 percent and usually less than 2 percent of residual meta-diethylbenzene in line 16.

In alternate processing the overhead substantially pure meta-diethylbenzene may be sent to storage by way of line 18 for use as such. It is preferred to oxidize overhead pure meta-diethylbenzene in either of three alternate procedures:-

A first alternate procedure is to heavily oxidize the meta-diethylbenzene to iso-phthalic acid in an oxidation zone 20. The iso-phthalic product, after purification and recovery, is sent to storage by way of line 22.

In a second alternate oxidation, the meta-diethylbenzene from line 14 is sent to a milder oxidation zone 24 where the product is oxidized to meta-diacetylbenzene where the product, after purification, is sent to storage by way of line 26.

In a third alternate oxidation procedure the meta-diethylbenzene may be subjected to oxidation under very mild conditions to produce meta-ethylacetophenone in oxidation zone 28. It is then purified and sent to storage by way of line 30.

The bottoms product of the initial distillation from still 12 in line 16 may also be treated in alternate procedures:

In a first alternate procedure, the mixture in line 32 is sent to a dehydrogenation zone 34 to produce a dehydrogenation mixture of para-divinylbenzene, para-ethylvinylbenzene and ortho-ethylvinylbenzene. In that treatment most of the ortho-product entering the dehydrogenator is converted to naphthalene. In further treatment the dehydrogenation product in line 36 may be resolved by crystallization, separating the divinylbenzene from the mono-vinyls thereby in a zone 38.

Alternately, the dehydrogenation product may be passed through line 40 and hydrogenated in a zone 42 to produce a product which is largely para-diethylbenzene and which may be separated from the minor residual ortho and naphthalene impurity content by distillation.

In a further alternate procedure, the bottoms product passing through line 16 may be subjected to oxidation. A drastic oxidation preformed in zone 44 converts the para-diethylbenzene to terephthalic acid which is readily purified and sent to storage by way of line 46.

In a milder oxidation the bottoms mixture in line 16 may be converted largely to para-diacetylbenzene in zone 48, and after purification, is withdrawn through line 50 to storage.

In a most mild oxidation, the product mixture in line 16 may be oxidized in zone 52 to para-ethylacetophenone which, after purification, is withdrawn to storage through line 54.

The operation of the process is further explained in the following as typical examples:

EXAMPLE I

Referring to FIG. 2, a polyalkylbenzene stream 11 recovered as a by-product from an alkylation plant in which ethylbenzene is produced by alkylation of benzene with ethylene is fed to a fractionating train 13. The fractionating train consists of column 15, which has approximately 80 theoretical separation stages, and colum 17, which has approximately 10 theoretical separation stages. The overhead product stream 9 from column 15 consists of light impurities which may be recycled to the alkylation plant or otherwise disposed of. Bottoms stream 19 from column 15 is fed to column 17, which separates the feed into a bottoms stream 21 and an overhead stream 23. Bottoms stream 21, which consists of heavy components, primarily polyalkylbenzenes, is recycled to the alkylation plant. The overhead stream 23 contains the desired mixed diethylbenzenes for further processing in accordance with the present invention.

Stream 23 is fed to the superfractionator, designated generally by the numeral 25. The superfractionator consists of fractionating colums 27 and 29, which are arranged in series. In place of columns 27 and 29, one large column could be used, but the division in two columns, with series hookup, is used in order to reduce the physical size of the superfractionator. Each of columns 27 and 29 provide approximately 100 theoretical separation stages for each column. In view of the series hookup, note that vapor is conveyed from the top of column 27 into the bottom of column 29 via line 31, and that liquid is conveyed from the bottom of column 29 to the top of column 27 via line 33. A reflux condenser 35 is provided to receive the overhead vapor 37 conveyed from the top of column 29. A reflux line, running from the reflux condenser 35 back into column 29, carries a reflux stream in quantity of approximately 49 times, by weight, of the overhead stream 37. A bottoms stream 41 exits from the bottom of column 27. An analysis of the more significant streams, just discussed, is given herebelow in Table 1.

TABLE 1

| Stream | Analysis—Weight % | | | | | |
|---|---|---|---|---|---|---|
| Line No. | 11 | 9 | 19 | 21 | 23 | 37 | 41 |
| Ethylbenzene | 0.3 | 9.4 | trace | — | trace | trace | — |
| Cumene | 0.3 | 9.4 | trace | — | trace | trace | — |
| Butyl benzenes | 2.6 | 75.3 | 0.2 | trace | 0.2 | trace | — |
| Meta-diethylbenzene | 55.3 | 5.5 | 56.9 | 1.0 | 62.5 | 98.0 | 2.1 |
| Para-diethylbenzene | 25.4 | 0.3 | 26.2 | 0.5 | 28.4 | 1.0 | 74.9 |
| Ortho-diethylbenzene | 7.9 | 0.1 | 8.2 | 0.2 | 8.9 | 0.6 | 23.0 |
| Triethylbenzene and heavier | 8.2 | — | 8.5 | 98.3 | — | 0.4 | — |

From the foregoing table, attention is directed to the high purity of the meta product obtained from the top column 29, i.e., 98 percent. Moreover, attention is directed to the low meta content of the bottoms stream 41 from column 27 of the superfractionator 25. Thus, the bottoms product from the superfractionator contains only 2.1 percent meta, the major part of the bottoms material consisting of about three fourths para-diethylbenzene and one fourth ortho-diethylbenzene.

Based on the stream 23 fed to the superfractionator, a yield of 63 percent by weight is obtained from the overhead stream 37, and a yield of 37 weight percent is obtained from the bottoms stream 41.

After separation of the diethylbenzene into a substantially pure meta-diethylbenzene overhead and a substantially pure para- and ortho-diethylbenzene bottoms, mixture, subsequent processing is made possible. The examples which follow are indicative of that processing. It should be noted that in certain instances in the examples the feed streams will not correspond precisely in composition to the meta-overhead stream 37 and the para-, ortho- bottoms stream 41 in the specific operation in accordance with Example I; however, it will be appreciated that slightly varied conditions vary the composition of the meta- stream, and ortho- and para- stream. Thus, reflux ratio may either be increased or decreased; the operation of the distillation train supplying raw feed to the superfractionator may be varied somewhat; the composition of the input stream to the fractionation train 13 (FIG. 2) may be changed somewhat; the column conditions for the superfractionator 25 may be changed somewhat; and the point of introduction of the feed 23 to the superfractionator may be varied. Accordingly, it will be appreciated that the following examples are indicative of operation with overhead and bottoms product from a superfractionator operating generally in accordance with Example I and on a feed comparable thereto.

EXAMPLE II

A feed of a composition similar to that of bottoms product 41 of Example I is utilized as a feed to an oxidation process for making terephthalic acid. The method used for this oxidation is further described in U.S. Pat. No. 3,766,281 for the nitric acid oxidation of xylenes. As suggested in this patent, chlorinated diphenyl (48 percent chlorine) is used as dispersing agent so that efficient stirring is possible throughout the reaction. 50 grams of a diethylbenzene mixture (ortho 21 percent, para 76 percent) is mixed with 50 grams of chlorinated diphenyl (48 percent chlorine). The diethylbenzene solution is heated to 125° C and then 70 percent aqueous nitric acid (d 1.42) is added dropwise at a mean rate of 1.15 ml per minute; after the addition of 30 ml of 70 percent HNO₃ and produced during the reaction is removed continuously from the reaction vessel and is collected in a condenser. A total of 390 ml of nitric acid is added in 340 minutes.

After cooling at room temperature the reaction mixture is mixed with ether and 28.6 grams of a pale yellow product was separated by filtration. This product is then extracted with hot water and acetone in order to leach out phthalic acid and acetylbenzoic acid. One obtains a yield of 74.5 weight percent of terephthalic acid on contained para-diethylbenzene or a 60.15 molar yield.

EXAMPLE III

A product similar to the bottoms product 41 obtained from the column 27 of fractionating train 25, Example I, has the following analysis:

| Component | Wt. % |
|---|---|
| meta-diethylbenzene | 4.3 |
| para-diethylbenzene | 74.3 |
| ortho-diethylbenzene | 21.4 |

The above-identified stream is charged to a fixed-bed dehydrogenation reactor, together with steam mixed therewith in a steam-hydrocarbon mole ratio of approximately 50:1. The steam-hydrocarbon mole feed mixture is fed continuously to the reactor at a temperature of approximately 600° C. The effluent from the reactor is condensed to form separate layers of water and hydrocarbon. An analysis of the hydrocarbon layer from the reactor effluent is as follows:

| Component | Wt. % |
|---|---|
| benzene | 0.8 |
| toluene | 0.7 |
| ethylbenzene | 0.4 |
| meta-diethylbenzene | 2.5 |
| para-diethylbenzene | 34.6 |
| ortho-diethylbenzene | 16.6 |
| meta-ethylvinylbenzene | trace |
| para-ethylvinylbenzene | 17.0 |
| ortho-ethylvinylbenzene | 1.2 |
| meta-divinylbenzene | 0.6 |
| para-divinylbenzene | 15.5 |
| naphthalene | 1.4 |
| unknown | 8.7 |

In addition to the above liquid product, a non-condensable gas fraction is produced in the reactor. It is a mixture of hydrogen, methane, and other light gases. The yield of the liquid hydrocarbon, from the effluent, is approximately 85 percent by weight, based on the hydrocarbon charge. The liquid hydrocarbon obtained from the effluent is subjected to distillation at a pressure of approximately 50 mm absolute in a column providing 70 theoretical separation stages, and at a reflux ratio of about 20:1. The bottoms product has the following analysis:

| Component | Wt. % |
|---|---|
| diethylbenzene | 0.4 |
| meta-ethylvinylbenzene | trace |
| para-ethylvinylbenzene | 46.4 |
| ortho-ethylvinylbenzene | 3.3 |
| meta-divinylbenzene | 1.6 |
| para-divinylbenzene | 42.3 |
| naphthalene & heavier | 6.0 |

The bottoms product just identified is then subjected to hydrogenation in a hydrogenation reactor using a cobalt-molybdenum catalyst under the following conditions:

| | |
|---|---|
| Catalyst | cobalt/molybdenum |
| Volume Feed/Volume Catalyst / Hour | 0.5/1 |
| $H_2$/H.C. Ratio (molar) | 5/1 |
| Temperature | 650°F |
| Pressure | 300 psig |

The effluent from the hydrogenation reactor is condensed and the hydrogen separated therefrom. The remaining liquid is found to have the following analysis:

| Component | Wt. % |
|---|---|
| para-diethylbenzene | 88.9 |
| meta-diethylbenzene | 1.5 |
| ortho-diethylbenzene | 3.1 |
| benzene | 0.4 |
| ethylbenzene | 0.6 |
| naphthalene & heavy material | 3.6 |
| heavy fraction | 1.9 |

Such liquid is then subjected to distillation to yield a light fraction consisting primarily of benzene and ethylbenzene, a heavy fraction, and a middle cut consisting of the following:

| Component | Wt. % |
|---|---|
| benzene & ethylbenzene | trace |
| para-diethylbenzene | 95.0 |
| meta-diethylbenzene | 1.7 |
| ortho-diethylbenzene | 3.3 |
| heavy components | trace |

It is seen that the resulting middle cut is a para-diethylbenzene product of rather high purity.

EXAMPLE IV

As an alternate procedure to the one described in Example III preceding, the bottoms product obtained on distilling the liquid hydrocarbon at a pressure of 50 mm absolute, using approximately 70 theoretical separation stages and at a reflux ratio of about 20:1, is fed to a distillation column wherein a heavy fraction, primarily naphthalene and heavier, is removed. A light fraction is obtained as follows:

| Component | Wt. % |
|---|---|
| diethylbenzene | 0.4 |
| meta-ethylvinylbenzene | trace |
| para-ethylvinylbenzene | 49.4 |
| ortho-ethylvinylbenzene | 3.5 |
| meta-divinylbenzene | 1.7 |
| para-divinylbenzene | 45.0 |

This light fraction is subjected in a two-step crystallization process to yield a para-divinylbenzene solid product and a mother liquor of the composition indicated hereinafter:

| Component | Wt. % Mother Liquor | Para-divinylbenzene product |
|---|---|---|
| diethylbenzene | 0.7 | trace |
| meta-ethylvinylbenzene | trace | trace |
| para-ethylvinylbenzene | 84.2 | 1.7 |
| ortho-ethylvinylbenzene | 5.8 | 0.2 |
| meta-divinylbenzene | 3.0 | 0.0 |
| para-divinylbenzene | 6.3 | 98.0 |

The yields of mother liquor and para-divinylbenzene product as identified above were, respectively, 57.8 percent and 42.2 percent by weight, based on the light fraction which was used as the feed to the crystallization.

EXAMPLE V 86.5 grams (100 ml) of high purity meta-diethylbenzene of the composition of stream 37 from column 29 from the superfractionator 25 of Example I is mixed with 100 grams of chlorinated diphenyl (48 percent chlorine) and treated as in Example II. A total of 960 ml. of 70 percent nitric acid are added in 660 minutes. The reaction product is then filtered at about 100° C and then washed at room temperature with acetone. The solid product contains 91 percent isophthalic acid. One obtains a yield of 69.4 weight of isophthalic acid based on meta-diethylbenzene or a 56 percent molar yield. It must be understood that nitric acid oxidation is not the only method for transforming diethylbenzenes into phthalic acids; therefore, Examples II and V are not examples of a preferred method and are only given as an illustration of how this transformation can be carried out by known methods.

EXAMPLE VI

A feed material is utilized having a composition similar to that of the bottoms stream 41 of column 27 of the super fractionator 25, the analysis of the feed material being as follows:

| Components | Wt. % |
|---|---|
| ortho-diethylbenzene | 18.0 |
| para-diethylbenzene | 80.0 |
| meta-diethylbenzene | 2.0 |

1,000 grams of this feed material is charged to an oxidation vessel and 0.125 percent cobalt sterate is added thereto. The mixture is stirred and heated under ambient pressure to a temperature of 125° C. A stream of oxygen is bubbled through the reaction mixture while the vessel is maintained at atmospheric pressure. The reaction is continued for 8 hours and then the reaction mixture allowed to cool. The gain of weight after reaction is 11 percent. Thereafter, the resulting reaction mixture is distilled and various fractions taken.

| Fractions | Wt. % |
|---|---|
| Unreacted diethylbenzene | 5.5 |
| Para-ethylacetophenone+ corresponding carbinol | 42.0 |
| Para-diacetylbenzene | 33.5 |
| Residue+acids | 19.0 |

Acids can be removed either before or after distillation by a caustic washing. Para-diacetylbenzene of analytical purity can be obtained by the removal of minute amounts of ortho-and meta-diacetylbenzene by crystallization out of a solvent such as ether. The unreacted diethylbenzene fraction is enriched in ortho-diethylbenzene; in the present example its concentration increases to 34.5 percent. The ethylacetophenone fraction can be processed as shown in the next example of recycled, together with fresh diethylbenzene, in a next oxidation run.

EXAMPLE VII

The reaction system, as in Example VI, is charged with the same hydrocarbon-catalyst mixture. However, oxidation is carried out at 125° C for only 65 minutes as opposed to the 8-hour period therein employed. Otherwise, oxidation conditions are maintained the same. The gain of weight after reaction is 2.5 percent. The resulting reaction mixture is distilled and various fractions taken:

| Fractions | Wt. % |
| --- | --- |
| Unreacted diethylbenzene | 53 |
| Ethylacetophenone + corresponding carbinol | 35 |
| Diacetylbenzene | 6.5 |
| Residue + acids | 5.5 |

Acids can be removed either before or after distillation by a caustic washing. In either case, acids are absent up to the diacetylbenzene fraction. Analysis of the ethylacetophenone fraction is as follows:

| | |
| --- | --- |
| Ortho-ethylacetophenone | 10.5% |
| Alpha-methyl-ortho-ethyl-benzyl-alcohol | 0.5% |
| Meta-ethylacetophenone | 1.0% |
| Para-ethylacetophenone | 65.0% |
| Alpha-methyl-para-ethyl-benzyl-alcohol | 23.0% |

Carbinols can be removed easily from this mixture by dehydrating them on acid catalysts into ethylstyrenes. It is then quite easy to separate fairly pure ortho- and para-ethylacetophenone by distillation. For some applications it is not necessary to remove carbinols and then distillation gives on one hand fairly pure ortho-ethylacetophenone and on the other hand a mixture containing essentially para-ethylacetophenone and alpha-methyl-paraethylbenzyl alcohol. The distillation gap between both isomers is of about 15° C and under 20 mm Hg allowing an easy separation with an efficient column. It is therefore evident that removing an alpha-hydrogen atom from a mixture of ortho- + para-diethylbenzene affords an easy separation of both isomers.

Previously meta derivatives of acetophenone were difficult to obtain in a pure form. Starting with pure meta-diethylbenzene, several pure meta derivatives can be obtained by controlled oxidation. Some of these derivatives are especially valuable for making heat stable polymers.

Examples 8 and 9 will show how either pure meta-ethylacetophenone or pure meta-diacetylbenzene can either be obtained in very good yield by choosing proper conditions.

EXAMPLE VIII

A feed material is utilized having a composition similar to that of overhead stream 37 of column 29 of Example I. 120 grams of 98 percent meta-diethylbenzene are charged to an oxidation vessel and 0.15 grams of cobalt sterate are added thereto. The mixture is stirred and heated under ambient pressure to a temperature of 125° C. A stream of oxygen is bubbled through the reaction mixture while the vessel is maintained at atmospheric pressure. The reaction is continued for 90 minutes. The resulting reaction mixture has the following analysis:

| Component | Wt. % |
| --- | --- |
| Meta-diethylbenzene | 28.6 |
| Meta-ethylacetophenone | 41.53 |
| Alpha-methyl-meta-ethyl-benzyl-alcohol | 10.93 |
| Meta-diacetylbenzene | 7.14 |
| Acids + residues | 7.16 |
| Unknown (including ortho- + para- isomers of hereabove volatile products) | 4.84 |

A fraction containing the whole of meta-ethylacetophenone and of alpha-methyl-meta-ethyl-benzyl-alcohol boiling at about 106° – 107° C/10 mm is easily separated by vacuum distillation. For some applications, i.e., when the ketone is further converted to the carbinol by hydrogenation (intermediate step in the meta-ethyl-styrene synthesis) the ketone and the carbinol do not need to be separated. When the pure ketone is desired the carbinol may either be catalytically dehydrogenated into meta-ethylacetophenone or catalytically dehydrogenated into ethyl-styrene which is easily removed by distillation. It is thus possible to get meta-ethylacetophenone with a purity of at least 97 percent. As it will be shown in the next example, a longer reaction time reduces the proportion of carbinol in the ketone but, of course, increases the meta-diacetylbenzene content.

EXAMPLE IX

In order to produce mainly meta-diacetylbenzene, an oxidation completely similar to that of Example VIII is carried out except that the reaction is continued for 425 minutes. The resulting reaction mixture has the following analysis:

| Component | Wt. % |
| --- | --- |
| Meta-diethylbenzene | 0.73 |
| Meta-ethylacetophenone | 29.9 |
| Alpha-methyl-meta-ethyl-benzyl-alcohol | 0.4 |
| Meta-diacetylbenzene | 52.1 |
| Acids residues | 15.4 |
| Unknown (including ortho- para- isomers of hereabove volatile products) | 1.47 |

A fraction containing essentially pure meta-diacetylbenzene only contaminated by a small amount of meta-ethylbenzoic acid and boiling at about 150° to 152° C / 10 mm is easily separated by vacuum distillation. The acid can easily be removed by caustic washing and a chemically pure meta-diacetylbenzene molting at 31° to 32° C is obtained by crystallization out of ether. Any unreacted meta-diethylbenzene and all light oxidation products can be recycled in a next oxidation run. This allows one to obtain a final weight yield of 90 to 100 percent of meta-diacetylbenzene based on meta-diethylbenzene disappearance.

EXAMPLE X

A normal ethylbenzene bottoms stream obtained as residue in the preliminary removal of ethylbenzene of distillation had the following analysis:

| Component | Wt. % |
| --- | --- |

| | |
|---|---|
| Ethylbenzene | 0.29 |
| C$_9$ hydrocarbon (ethyl toluene) | 2.95 |
| C$_{10}$ (butyl benzene) | |
| Meta-diethylbenzene | 55.23 |
| Para-diethylbenzene | 25.40 |
| Ortho-diethylbenzene | 7.87 |
| Heavy hydrocarbon | 8.26 |

A total of 27 volumes of this stream were fed to a superstill having 239 distillation stages disposed as a series of three columns and operated first at total reflux to produce an equilibrium condition, and then distillation was allowed to proceed at a reflux ratio of 65:1. The overhead was collected as a series of equal volume part fractions, except that the first four volumes of light materials were discarded.

The following table shows the specific analysis of each volume collected as individual samples:

TABLE II

| Sample No. | MDEB | PDEB | ODEB | E. B. | Butyl Benzene | Volumes |
|---|---|---|---|---|---|---|
| | First 4 volumes discarded | | | | | |
| 1 | 54.69 | 4.99 | 2.42 | — | 37.90 | 1 |
| 2 | 61.18 | 2.15 | 9.87 | 17.80 | 13.82 | 1 |
| 3 | 68.20 | 0.86 | 0.49 | — | 30.45 | 1 |
| 4 | — | — | — | — | — | 1 |
| 5 | — | — | — | — | — | 1 |
| 6 | — | — | — | — | — | 1 |
| 7 | 94.73 | 9.44 | 9.32 | 3.31 | 0.46 | 1 |
| 8 | 96.44 | 1.06 | 0.76 | 0.65 | 1.04 | 1 |
| 9 | 97.92 | 0.43 | 0.36 | 0.46 | 0.77 | 1 |
| 10 | 98.55 | 0.38 | 0.19 | 0.31 | 0.53 | 1 |
| 11 | 98.90 | 0.28 | 0.14 | 0.22 | 0.35 | 1 |
| 12 | 97.25 | 0.87 | 0.61 | 0.74 | 0.46 | 1 |
| 13 | 97.51 | 0.44 | 0.42 | 0.89 | 0.66 | 1 |
| 13-A | 96.37 | 1.49 | 0.82 | 0.61 | 0.65 | 1 |
| 14 | 97.30 | 0.94 | 0.73 | 0.43 | 0.54 | 1 |
| 15 | 98.02 | 0.74 | 0.54 | 0.29 | 0.37 | 1 |
| 16 | 96.96 | 1.57 | 0.91 | 0.24 | 0.32 | 1 |
| 17 | 94.54 | 3.24 | 1.77 | 0.20 | 0.25 | 1 |
| 18 | 88.44 | 7.28 | 4.05 | 0.11 | 0.12 | 1 |
| 19 | 83.81 | 10.55 | 5.50 | 0.07 | 0.07 | 1 |
| 20 | 84.14 | 10.16 | 5.58 | 0.06 | 0.06 | 1 |
| 21 | 80.27 | 12.01 | 7.60 | 0.07 | 0.05 | 1 |
| 22 | 68.37 | 20.06 | 11.49 | 0.05 | 0.03 | 1 |
| 23 | 52.04 | 31.55 | 16.32 | 0.04 | 0.05 | 1 |

Referring to FIG. 2, as described in detail in Example I, the superfractionator 25 splits a diethylbenzene isomer feed mixture into a meta-rich overhead 37 and a para, ortho-diethylbenzene rich bottoms mixture 41. The meta-rich overhead stream 37 is conducted from the reflux condenser 35 to the oxidation reactor 51. Cooling is provided for the oxidation reactor 51 by means of passing water through a water reactor jacket. The product from the oxidation reactor is conveyed to a vessel 53, which is provided with heat transfer means to cool the reaction mixture well below the melting point of isophthalic acid, which precipitates. The resulting slurry is then conveyed to a filter 55, from which isophthalic acid, identified as a product stream 57, is then removed as a solid component. The mother liquor 59 may be utilized for various subsequent processing, recycled in part, or discarded, as desired.

Further referring to FIG. 2, the product stream 41 from column 27 may be conveyed via conduit means 61 to an oxidation reactor 63, which is of the same general nature as the oxidation reactor 51, previously discussed, and the effluent therefrom conducted to a vessel 65 to obtain solid precipitate high in teraphthalic acid content. This precipitate is conveyed, along with the mother liquor from vessel 65 to a filtration unit 67. The mother liquor from the filtration unit, identified as stream 69, may be utilized in various subsequent processing, recycled in part, or discarded as desired. The solid precipitate is transferred from the filtration unit 67 to a wash vessel 71 wherein it is thoroughly washed with cold water, and thereafter conveyed to leaching vessel 73, where hot water, (e.g. 98°–100° C) thoroughly contacts the precipitate to leach impurities, more particularly phthalic acid, from it. The resulting solid material, identified on FIG. 2 at the arrowhead 75 emerging from vessel 73, is a highly pure terephthalic acid product.

As an alternative to the above, or if desired, as additional means for the process equipment provided for processing diethylbenzenes, the bottoms mixture from the column 27 is conveyed via conduit means 81 to dehydrogenation reactor 83. The effluent from the reactor is conveyed to a separator 85, wherein water is withdrawn and reaction gases formed in the reaction exit overhead. The hydrocarbon effluent 87 from separator 85 is piped to distillation column 89. The overhead product 91 may be utilized for various processing; recycled to the dehydrogenation reactor, at least in part; or disposed of, as desired. The bottoms product 93 is transferred through either of two alternate lines 95 or 97 for subsequent processing. If desired, the bottoms stream 93 may be split with part conveyed through the conduit 95 and part through the conduit 97.

Attention is directed first to the process route via conduit 95, by which bottoms product stream 93 enters hydrogenation reactor 98 from line 95. Therein the stream 93 is comparatively mildly hydrogenated. The effluent from hydrogenation reactor 98 is conducted to condenser 99, from which non-condensible gases are removed. The product stream 101 from condenser 99 is piped as a feed to distillation column 103, from which is withdrawn an overhead light fraction 105. The bottoms product 107 from column 103 is piped to column 109 which separates it into an overhead fraction 111 and a bottoms fraction 113. The overhead fraction 111 is para-diethylbenzene product of rather high purity.

The processing of bottoms stream 93 from fractionator 89 will now be described. Bottoms material 93 is conveyed via conduit 97 as feed from column 121, which divides it into an overhead fraction 123 and a bottoms fraction 125. The bottoms fraction 125 may be utilized or discarded as is expeditious. The overhead fraction 123 is conveyed to a crystallizer 126, preferably providing two effective crystallization stages, and a solid product is recovered therefrom, identified by the arrowhead 127 leading from crystallizer 126 of FIG. 2. The solid product 127 is found to be a para-divinylbenzene product of quite high purity. The mother liquor stream 129 is conveyed from the crystallizer and recycled in part, further processed to produce various desired products, or otherwise disposed of.

Figure 3:
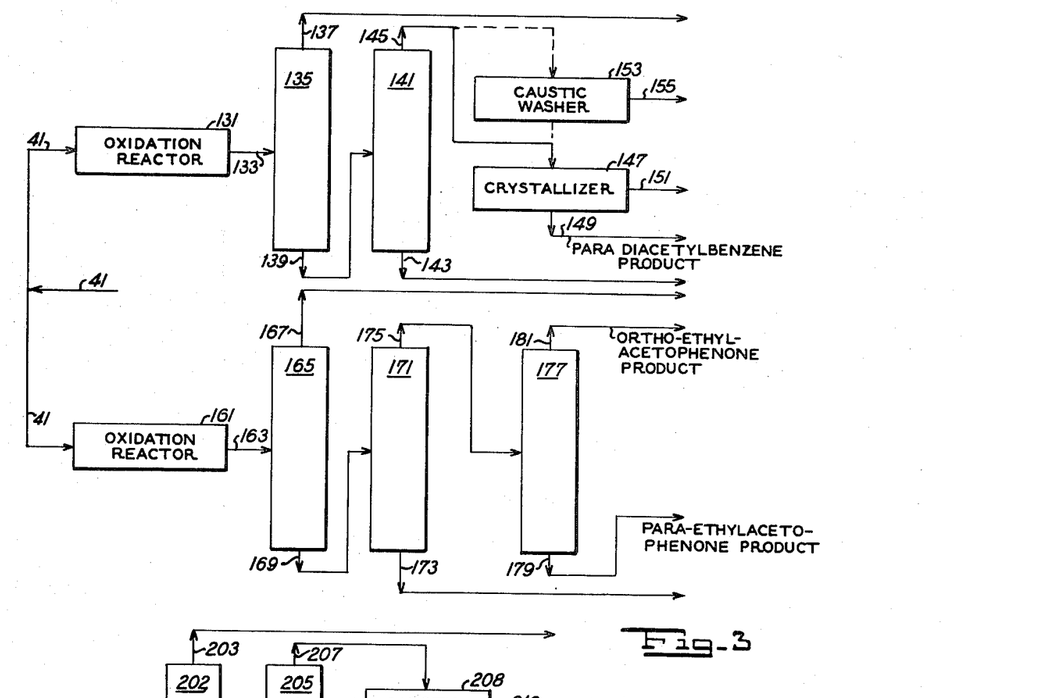
FIG. 3 illustrates two alternate oxidation processes which may be conducted on the para-, ortho-diethylbenzene concentrate to obtain ultimate products of high purity.

As an alternate, or in addition, to the oxidation reaction carried out on the para, ortho-diethylbenzene mixture 41 of FIG. 2, other oxidation routes may be provided. Referring to FIG. 3, bottoms material 41 may be conveyed to the oxidation reactor 131, which is suitably cooled. This reactor operates under milder conditions than reactor 63 of FIG. 2, being controlled to produce a substantial quantity of diacetylbenzene product. The effluent 133 from oxidation reactor 131 is conveyed to distillation column 135, from which exists an undesired overhead fraction 137, and a desired bottoms fraction 139. The bottoms fraction 139 is conveyed to distillation column 141. Column 141 splits the material processed therein into an undesired bottoms 143 and a desired overhead 145, which is conveyed to a crystallizer 147, preferably of two or more stages. If ethylbenzoic acids are to be recovered separately, overhead 145 may first pass through caustic washer 153; caustic washer 153 separates a small amount of para + ortho-ethylbenzoic acids under the form of aqueous salts being indicated on FIG. 3 as the arrowhead 155. If those acids are not to be recovered separately, caustic washer 153 may be omitted. Acids will then stay in mother liquor 151 of crystallizer 147 together with ortho-disacetylbenzene and other impurities. A para-diacetylbenzene product of high purity in excess of 97 percent is obtained as product from crystallizer 147, being indicated on FIG. 3 as the arrowhead 149 emerging from crystallizer 147. Mother liquor 151 is removed from crystallizer 147.

As an alternative method of processing the para, ortho-diethylbenzene mixture 41, or processing a part thereof, the mixture 41 is conveyed through oxidizer 161 to obtain effluent 163 which feeds distillation column 165 from which is withdrawn light fraction 167 to overhead product. Bottoms product from column 165 is conveyed to column 171, which divides it into an undesired bottoms material 173, which is withdrawn and an overhead fraction 175 is conveyed to distillation column 177 providing ample theoretical stages to obtain as overhead substantially pure ortho-ethylacetophenone being indicated in FIG. 3 as the arrowhead 181 emerging from column 177 and as bottoms fraction, substantially pure para-ethylacetophenone being indicated as the arrowhead 179. Milder oxidation conditions are maintained for the reactor 161, as compared to reactor 131. Consequently, the formation of mono-acetyl product as opposed to diacetyl product is favored.

Figure 4:
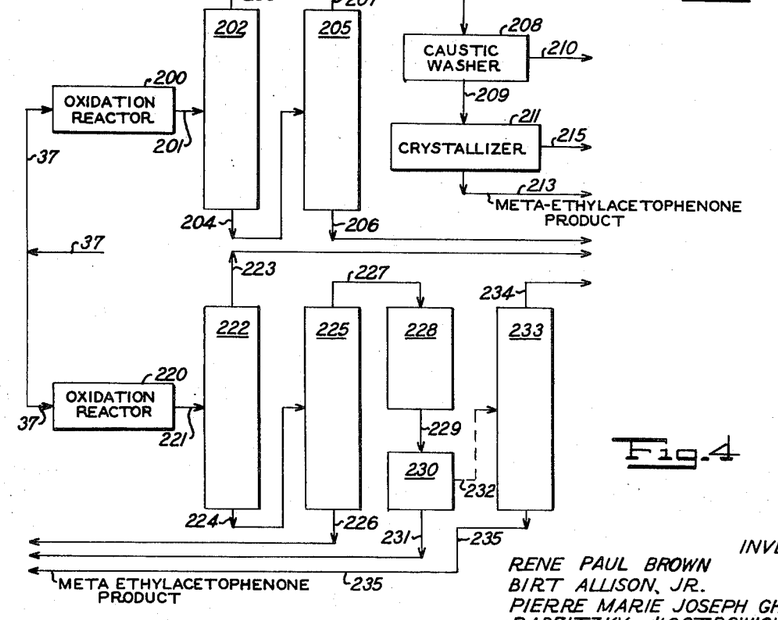
FIG. 4 illustrates two alternate oxidation processes which may be conducted on the meta-isomer to obtain ultimate products of high purity.

As an alternate, or in addition, to the oxidation reaction carried out on the substantially pure meta-diethylbenzene 37 of FIG. 2, other oxidation routes may be provided. Referring to FIG. 4, overhead meta-diethylbenzene 37 may be conveyed to the oxidation reactor 200 which is suitable cooled. This reactor operates under milder conditions than reactor 51 of FIG. 2, being controlled to produce a substantial quantity of meta-diacetylbenzene product. The effluent 201 of oxidation reactor 200 is conveyed to distillation column 202 from which exits an undesired overhead fraction 203 and a desired bottoms fraction 204. The bottoms fraction 204 is conveyed to distillation column 205. Column 205 splits the material processed therein into an undesired bottoms 206 and a desired overhead 207 which is conveyed to caustic washer 208. Caustic washer 208 separates a small amount of meta-ethylbenzoic acid in the form of an aqueous salt being indicated in FIG. 4 as the arrowhead 210.

Substantially pure meta-diacetylbenzene 209 may still be optionally purified by crystallizer 211 to a chemically pure product, being indicated as arrowhead 213. Mother liquor 215 is removed from crystallizer 211.

As an alternative method of processing the meta-diethylbenzene 37, or processing a part thereof, the substantially pure meta-diethylbenzene 37 is conveyed through oxidizer 220 to obtain effluent 221 which feeds distillation column 222 from which is withdrawn light fraction 223 as overhead product. Bottoms product from column 222 is conveyed to column 225 which divides it into an undesired bottoms material 226, which is withdrawn and an overhead fraction 227. This fraction is a mixture of pure meta-ethylacetophenone and of a minor amount of pure alpha-methyl-meta-ethylbenzyl alcohol. For some applications this fraction 227 may be used as such. Optionally, fraction 227 may be fed to dehydrator 228 which splits water from the alcohol; the resulting mixture 239 is passed through the water separator 230 from which water is withdrawn is being indicated by arrowhead 231.

The dehydrated mixture 232 is conveyed to column 233 from which emerges as the overhead product 234 substantially pure meta-ethyl- styrene and, as desired, bottoms 238 nearly pure meta-ethylacetophenone. Milder oxidation conditions are maintained for the reactor 220 as compared to reactor 200. Consequently, the formation of meta-ethylacetophenone as opposed to meta-diacetylbenzene is favored.

Thus, applicant performs in certain alternate steps as unique separation of ethylbenzene isomers at least in the first step to separate a substantially pure meta-diethylbenzene overhead from a relatively pure ortho- and meta-diethylbenzene bottoms fraction. By performing additional or alternate oxidation steps, further purification is available in the form of selected oxidation or dehydrogenation products wherein at least one alpha-carbon atom is oxidized or dehydrogenated into an easily separable derivative to produce such pure products from both the overhead and bottoms fractions. From the overhead pure meta-diacetylbenzene, meta-ethylacetophenone, isophthalic acid, alpha-methyl-meta-ethylbenzyl alcohol or their hydrocarbon analogs, pure diethylbenzene as stated or ethylstyrene, each as a substantially pure meta-isomer. From the bottoms mixture or predominantly ortho- and para-diethylbenzene, we prepare para-ethylacetophenone, para-diacetylbenzene, alpha-methyl-para-ethylbenzyl alcohol, para-divinylbenzene, para-ethylvinylbenzene and the parent hydrogenated isomer para-diethylbenzene.

Other modifications following the principles of this invention are available to produce the same product or other intermediates. For instance, oxidation can be accomplished in two steps, one to conversion to a mono-acetyl and a subsequent step to convert the mono-acetyl ethylbenzene to diacetylbenzene.

A further advantage of separating in two steps is that intermediate purification may be applied with consequent reduction of reaction products and with ultimate higher purity of the end product.

Thus, the process hereof in addition to preliminary distillation to separate the meta-diethylbenzene includes, as preferred embodiments, oxidation of both overhead and bottoms products to various oxidation products in pure form and to dehydrogenation of the bottoms product followed by rehydrogenation or crystallization to produce a pure para-diethylbenzene in the hydrogenation and a pure para-divinylbenzene in the crystallization. These several purifications, it will be appreciated, are made from a bottom product initially a mixture of ortho- and para-diethylbenzene isomers which have been substantially freed of the meta-isomer to a content of less than 5 percent and usually not more than about 2 percent.

Accordingly, it is intended that the description and examples given hereinabove be regarded as illustrative and not limiting except as defined in the appended claims.

What is claimed is:

1. The process of treating an isomeric mixture of diethylbenzenes containing from about 20 to 80 percent of meta-isomer to convert said isomeric mixture into more readily separable components, comprising distilling said mixture in a column exceeding about 100 distillation stages to separate an overhead fraction of at least 93 percent pure meta-diethylbenzene isomer and a bottoms fraction comprising a mixture of ortho- and para-diethylbenzene isomers containing less than about 5 percent of meta-diethylbenzene as contaminant, and dehydrogenating the bottoms mixture of diethylbenzene isomers to produce a dehydrogenation product comprising a mixture of vinylbenzene isomers consisting substantially of para-divinylbenzene, para-ethylvinylbenzene and ortho-ethylvinylbenzene, substantially free of ortho-divinylbenzene.

2. The method of claim 1 wherein the mixed vinylbenzene isomers are further purified by distillation.

3. The method of claim 1 wherein said mixed vinylbenzene isomers are rehydrogenated.

4. The method of claim 1 wherein the mixed vinylbenzene isomers are first rehydrogenated and then distilled to separate substantially pure para-diethylbenzene.

5. The method of claim 4 wherein the dehydrogenated vinylbenzene bottoms mixture is first distilled to separate a vinylbenzene concentrate rich in para isomers, and said concentrate is rehydrogenated and then again distilled.

6. The method of claim 1 where in the mixed para- and ortho-vinylbenzene isomers are purified by crystallization to separate purified concentrates of vinylbenzene.

7. The method of claim 1 wherein substantially pure para-divinylbenzene is separated by crystallization.

8. The method of treating an isomeric mixture of ethyl and diethyl benzenes to convert the isomeric diethylbenzene into more readily separable components comprising first separating a meta-diethylbenzene fraction having a purity ranging from at least about 93 percent ot about 99 percent from synthetic ethylbenzene formed by alkylation of benzene containing mixed diethylbenzene isomers as impurities by distilling overhead the ethylbenzene while taking off a side stream comprising some ethylbenzene and $C_9$ hydrocarbon impurities and leaving a bottoms mixture of isomeric diethylbenzene containing 20 to 80 percent of meta-diethylbenzene, and the remainder comprising para-diethylbenzene, ortho-diethylbenzene and heavier components, fractionally super-distilling said diethylbenzene containing bottoms mixture to separate overhead a fraction of meta-diethylbenzene having a purity ranging from at least about 93 percent to about 99 percent and para- and ortho-diethylbenzene concentrate bottoms mixture containing less than 2 percent of meta-diethylbenzene in a distillation column exceeding about 100 distillation stages and at a reflux ratio exceeding about 40:1, and dehydrogenating the bottoms mixture to produce a bottoms product comprising mixed vinylbenzene isomers and separating and purifying said vinylbenzene isomers.

9. The method of claim 8 wherein said vinylbenzene isomers are rehydrogenated and then distilled.

10. The method of claim 8 wherein said vinylbenzene isomers are separated by crystallization.

11. In the processing to convert a mixture of diethylbenzene isomers into more readily separable components, the steps of superdistilling a feed comprising mixed meta-, para- and ortho- isomers of diethylbenzene in a column exceeding about 100 distillation stages and at a reflux ratio exceeding 40:1 to obtain a meta- enriched overhead comprising meta-diethylbenzene having a purity ranging from about 93 percent to about 99 percent and a low meta-isomer content bottoms mixture, said feed containing meta-diethylbenzene isomer in weight fraction of at least about one-fifth and no greater than about four-fifths, based on the total weight of the meta-, ortho- and para-diethylbenzene isomers in said feed, said low meta-isomer content bottoms mixture containing no more than about 5 percent meta-diethylbenzene based on the total weight of the para-, ortho- and meta- isomers of diethylbenzene in said low meta-isomer content bottoms mixture, and oxidizing said low meta content bottoms mixture to remove from a substantial quantity thereof at least one atom of hydrogen from the alpha-carbon of at least one of the two original ethyl groups present and dehydrogenating the bottoms mixture to produce a bottoms product comprising mixed vinylbenzene isomers and separating and purifying said vinylbenzene isomers.

12. The method of claim 11 wherein said vinylbenzene isomers are rehydrogenated and then distilled.

13. The method of claim 11 wherein said vinylbenzene isomers are separated by crystallization.

* * * * *